(12) United States Patent
Vernickel et al.

(10) Patent No.: US 9,669,765 B2
(45) Date of Patent: Jun. 6, 2017

(54) WORK MACHINE, IN PARTICULAR DUMP TRUCK OR TRUCK

(71) Applicant: Liebherr-Mining Equipment Colmar SAS, Colmar (FR)

(72) Inventors: Kilian Vernickel, Bruckmühl (DE); Frank Hundertpfund, Schwanau (DE); Burkhard Richthammer, Freiburg (DE)

(73) Assignee: Liebherr-Mining Equipment Colmar SAS, Colmar (FR)

(*) Notice: Subject to any disclaimer, the term of this patent is extended or adjusted under 35 U.S.C. 154(b) by 0 days.

(21) Appl. No.: 14/635,340

(22) Filed: Mar. 2, 2015

(65) Prior Publication Data
US 2015/0246642 A1 Sep. 3, 2015

(30) Foreign Application Priority Data

Mar. 3, 2014 (DE) ...................... 10 2014 003 155

(51) Int. Cl.
| | | |
|---|---|---|
| *B60R 3/02* | (2006.01) | |
| *B60P 1/04* | (2006.01) | |
| *B60R 3/00* | (2006.01) | |
| *B62D 33/06* | (2006.01) | |
| *B60P 1/28* | (2006.01) | |

(52) U.S. Cl.
CPC ........ *B60R 3/02* (2013.01); *B60P 1/04* (2013.01); *B60P 1/283* (2013.01); *B60R 3/005* (2013.01); *B62D 33/0617* (2013.01)

(58) Field of Classification Search
CPC ... H04R 1/028; B60R 3/00; B60R 3/02; E02F 9/0833
See application file for complete search history.

(56) References Cited

U.S. PATENT DOCUMENTS

| | | | | | |
|---|---|---|---|---|---|
| 1,867,904 | A | * | 7/1932 | Bessler .................. | E04F 11/06 182/106 |
| 3,871,479 | A | * | 3/1975 | Pelto ........................ | A62B 5/00 182/106 |
| 3,997,211 | A | * | 12/1976 | Graves ...................... | B60R 3/02 182/116 |
| 4,067,588 | A | * | 1/1978 | Morge .................. | E02F 9/0833 182/93 |
| 4,240,521 | A | * | 12/1980 | Naka ........................ | E06C 9/08 182/100 |

(Continued)

FOREIGN PATENT DOCUMENTS

| | | |
|---|---|---|
| JP | 2008-240278 A | 10/2008 |
| JP | 2012-218606 A | 11/2012 |

*Primary Examiner* — Brian Swenson
(74) *Attorney, Agent, or Firm* — Dilworth & Barrese, LLP

(57) ABSTRACT

The present invention relates to a work machine, in particular in the form of a dump truck or of a truck, having an upper deck which can be walked on arranged at the front above a bumper and having an operator's cabin arranged laterally on the upper deck with at least one step-like access system arranged in front of the operators cabin. In accordance with the invention, an intermediate stand lowered with respect to the upper deck is arranged in front of the operator's cabin and steps lead in each case laterally to the upper deck from this while steps lead at least to the bumper from the intermediate stand to the front in the direction of travel.

15 Claims, 7 Drawing Sheets

(56) References Cited

U.S. PATENT DOCUMENTS

| | | | | |
|---|---|---|---|---|
| 4,243,120 A * | 1/1981 | Pratt, Jr. | B60R 3/02 | 182/127 |
| 4,244,443 A * | 1/1981 | Naka | E06C 1/125 | 182/100 |
| 4,627,200 A * | 12/1986 | Lapeyre | E04F 11/025 | 182/228.1 |
| 5,033,582 A * | 7/1991 | Hoben | B60R 3/02 | 182/106 |
| 5,064,022 A * | 11/1991 | Graham | B60R 3/02 | 182/127 |
| 5,064,023 A * | 11/1991 | Loeber | B60R 3/00 | 182/127 |
| 5,988,316 A * | 11/1999 | Hedley | B60R 3/02 | 182/127 |
| 6,000,496 A * | 12/1999 | Rinaldi | B60R 3/02 | 182/127 |
| 6,347,686 B1 * | 2/2002 | Hedley | B60R 3/02 | 182/127 |
| 6,981,572 B2 * | 1/2006 | Hedley | B63B 27/14 | 182/127 |
| 6,986,402 B2 * | 1/2006 | Hedley | E06C 5/04 | 182/127 |
| 7,111,858 B2 * | 9/2006 | Manser | B60R 3/02 | 182/127 |
| 7,469,915 B2 * | 12/2008 | Horn | E06C 9/08 | 182/127 |
| 7,637,557 B2 * | 12/2009 | Regnell | B60R 3/02 | 280/163 |
| 7,775,169 B2 * | 8/2010 | Horn | E06C 9/08 | 111/200 |
| 7,827,641 B2 * | 11/2010 | Hoffman | B65G 69/30 | 14/69.5 |
| 8,008,877 B2 * | 8/2011 | Fushiki | B60K 6/46 | 180/65.1 |
| 8,011,474 B2 * | 9/2011 | Boroski | B60R 3/02 | 182/127 |
| 8,028,804 B2 * | 10/2011 | Lair | E04F 11/064 | 182/77 |
| 8,336,825 B2 * | 12/2012 | Meyer-Rusitschka | B64C 1/24 | 182/106 |
| 8,397,869 B2 * | 3/2013 | Tsutsumi | E02F 9/0833 | 182/127 |
| 8,505,944 B2 * | 8/2013 | Genest | B60R 3/02 | 280/166 |
| 8,511,431 B2 * | 8/2013 | Woolley | E06C 5/36 | 182/106 |
| 8,668,048 B1 * | 3/2014 | Morris | E06C 5/04 | 182/127 |
| 8,668,216 B2 * | 3/2014 | Ellement | E06C 5/28 | 182/127 |
| 8,689,939 B2 * | 4/2014 | Kim | B60R 3/02 | 182/127 |
| 8,720,924 B2 * | 5/2014 | Ruehl | B60R 3/00 | 280/164.1 |
| 8,814,192 B2 * | 8/2014 | Tanaka | B60R 3/00 | 280/163 |
| 8,881,867 B2 * | 11/2014 | Takenawa | E02F 9/0833 | 182/127 |
| 8,960,345 B2 * | 2/2015 | Uozu | B60L 11/126 | 180/68.1 |
| 2001/0030081 A1 * | 10/2001 | Morimoto | B60R 3/02 | 182/85 |
| 2006/0272896 A1 * | 12/2006 | Rajewski | E06C 1/12 | 182/127 |
| 2009/0038885 A1 * | 2/2009 | Ellement | B60R 3/02 | 182/97 |
| 2009/0322052 A1 * | 12/2009 | Ruehl | B60R 3/02 | 280/166 |
| 2012/0068432 A1 * | 3/2012 | Tanaka | B60R 3/00 | 280/163 |
| 2013/0187354 A1 * | 7/2013 | Venkataraman | B60R 3/005 | 280/166 |
| 2013/0199862 A1 * | 8/2013 | Ogawara | B60R 19/52 | 180/68.1 |
| 2014/0062134 A1 * | 3/2014 | Braun | B60R 3/005 | 296/190.09 |
| 2014/0174851 A1 * | 6/2014 | Kennedy | E06C 5/04 | 182/84 |
| 2015/0068470 A1 * | 3/2015 | Tsutsumi | B60K 11/04 | 123/41.7 |
| 2015/0092393 A1 * | 4/2015 | Oetken | E02F 9/0833 | 362/89 |
| 2015/0246642 A1 * | 9/2015 | Vernickel | B60P 1/283 | 280/166 |
| 2015/0251610 A1 * | 9/2015 | Kugelstadt | B60K 6/405 | 298/17 R |
| 2015/0251611 A1 * | 9/2015 | Richthammer | B60K 6/46 | 180/65.245 |
| 2015/0352943 A1 * | 12/2015 | Hoffmann | B60K 11/02 | 180/65.21 |
| 2015/0352944 A1 * | 12/2015 | Hoffmann | B60K 6/20 | 180/65.21 |

* cited by examiner

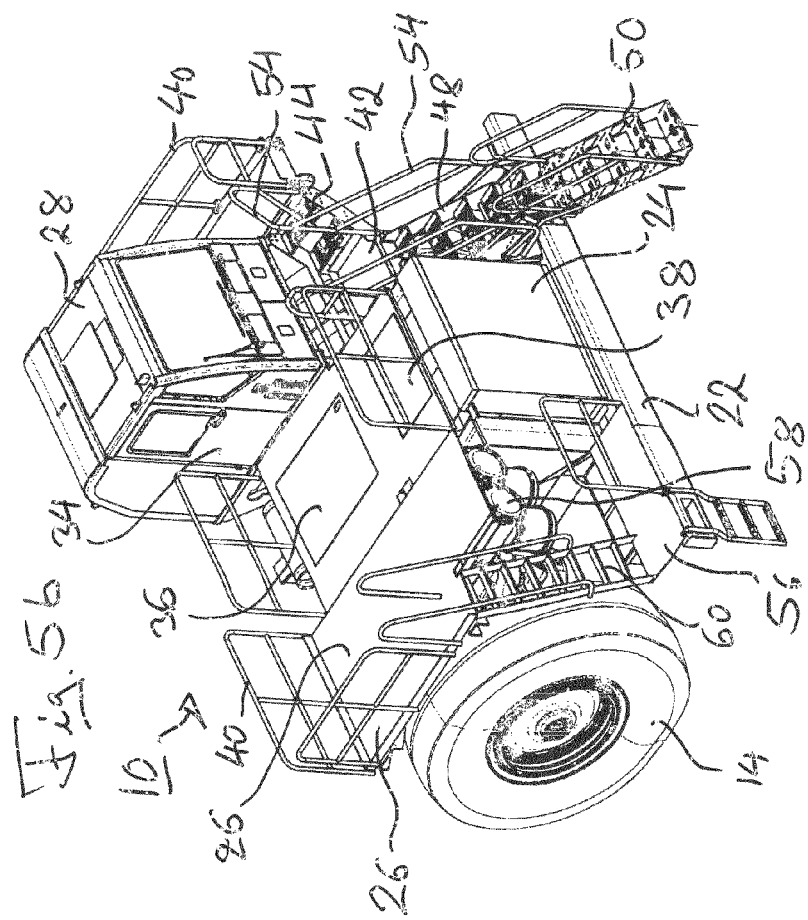
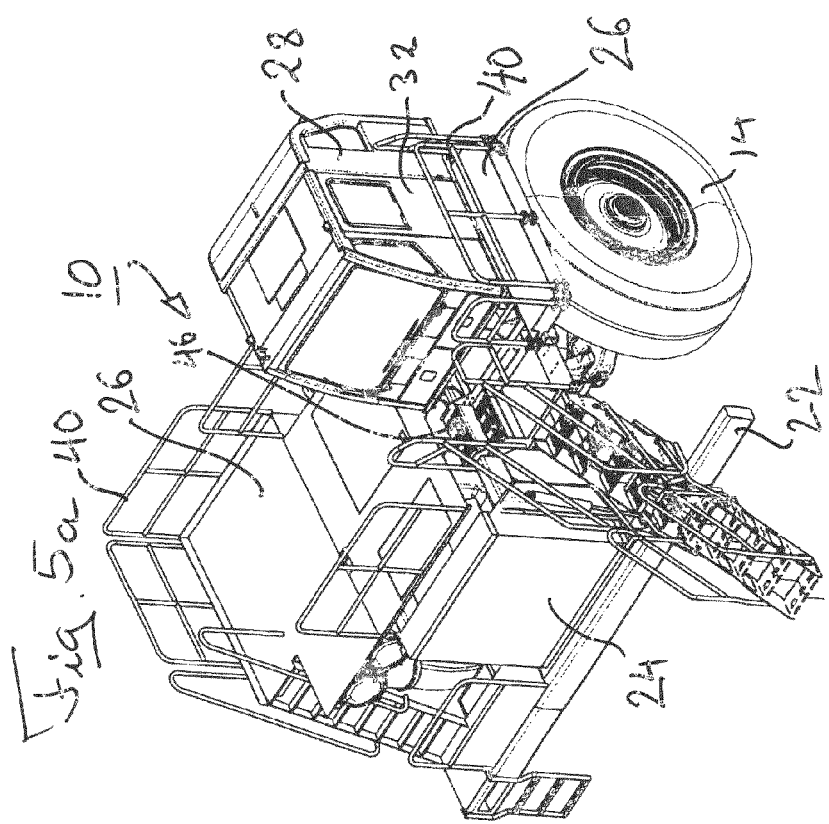

WORK MACHINE, IN PARTICULAR DUMP TRUCK OR TRUCK

BACKGROUND OF THE INVENTION

The invention relates to a work machine, in particular in the form of a dump truck or of a truck, having an upper deck which can be walked on arranged in its front region above a bumper and having an operators cabin arranged laterally on the upper deck with at least one step-like access system arranged in front of the operators cabin.

Dump trucks or so-called large dump trucks are predominantly used in coaling mining operations or ore mining operations for the transport of the mined coal, minerals and ores. These bulk material dumpers are manufactured in sizes of more than 90 metric tons (t) up to several 100 t in weight and payload so that they have very large dimensions overall.

A large radiator is typically arranged above the bumper in the part of the work machine at the front in the direction of travel and an upper deck which can be walked on is disposed above it. The operator's cabin is typically arranged laterally above one of the wheels at the level of the upper deck. An access system which typically comprises ladders or steps has to be provided for the personnel due to the height of the large-dimensioned work machines. Such access systems for large work machines are subject to increasingly stricter safety demands.

A work machine of the category having a corresponding access system is known, for example, from US 2012/0068432 A1. A dump truck here has corresponding access steps which lead to a platform arranged in front of the radiator grill of the dump truck. For this purpose, the steps are arranged partly laterally next to the radiator, with them being curved by 90 degrees in the region of the platform and lying on the platform directly in front of the radiator grill. This means that the personnel generally has to climb onto the work machine in front of the radiator. The climbing onto the work machine in the region in front of the radiator is, however, not desirable for technical safety reasons.

SUMMARY OF THE INVENTION

It is the object of the present invention to further develop a work machine of the category such that it has a safe access system with is comfortable in use without the view of the personnel in the operator's cabin being impeded.

This object is achieved in accordance with the invention by a work machine having the features herein. Starting from a work machine, in particular in the form of a dump truck or of a truck, having an upper deck which can be walked on disposed at the front side above the bumper and having an operators cabin arranged laterally on the upper deck with at least one step-like access system arranged in front of the operators cabin, an intermediate stand lowered with respect to the upper deck is arranged in front of the operators cabin in accordance with the invention from where steps respectively lead to the upper deck at the side, while steps from the intermediate stand lead at least up to the bumper directed to the front in the direction of travel. Viewed from the front, an arrangement of the steps in the form of a Y results with this access system. The personnel can climb onto the intermediate stand from the front via the steps and can there then select one of the two sets of steps at the side to reach the upper deck.

The intermediate stand is advantageously lowered with respect to the upper deck at whose level the operator's cabin is located. The view of the operator is thereby not impeded by a person standing on the intermediate stand. It is furthermore also ensured that corresponding handrails which are provided in the region of the intermediate stand do not protrude into the field of view of the operator's cabins.

Preferred embodiments of the invention result from the description herein.

The inclination of the steps can accordingly amount to constantly between 40 and 50 degrees, preferably 45 degrees. A constant upward or downward climbing inclination for the personnel is hereby provided, whereby a safe access is ensured.

In accordance with a preferred embodiment of the invention, a lowerable step part, which is preferably hydraulically actuable, can adjoin the steps directed to the front in the direction of travel and extends the steps as required from the bumper down to the ground.

An emergency ladder which can be folded down to the ground can be arranged in the region of the bumper. This is in particular of importance when the lowerable step part is upwardly pivoted and cannot be lowered from this position.

Handrails are advantageously arranged at the steps to satisfy the usual safety standards.

In accordance with a preferred embodiment of the invention, a further intermediate stand can be arranged at the level of the bumper.

In this embodiment, which has a second intermediate stand at the level of the bumper, a pivotable ladder can also be pivotally connected instead of the lowerable step part, with said ladder being able to be pivoted into a downwardly pivoted position from the intermediate stand. Alternatively, the ladder can also be pivotable into an upwardly pivoted position with respect to the intermediate stand. In this position, it can simultaneously also represent a part of the safety guard rail which otherwise surrounds the platform.

It is particularly preferred if an emergency ladder directed to the front in the direction of travel extends from the upper deck at the side disposed opposite the operator's cabin up to an intermediate stand arranged at the level of the bumper. Such second accesses have to be provided for safety reasons in order also to allow a secure climbing down, for example, when there is a tire fire or another problem at a side of the vehicle, for example.

In accordance with a further advantageous embodiment of the invention, a ladder can be pivotably connected to the intermediate stand provided at the level of the bumper such that it can be pivoted from a position pivoted downward from the intermediate stand into an upwardly pivoted position with respect to the intermediate stand.

In accordance with a further embodiment of the invention, the inclination of the emergency steps can be selected as steeper than that of the step system arranged in front of the operators cabin.

BRIEF DESCRIPTION OF THE DRAWINGS

Further features, details and advantages of the invention will be explained in more detail with reference to an embodiment shown in the drawing. There are shown:

FIG. 5a to FIG. 9b: detailed views of the front region of a dump truck in respective perspective views.

DESCRIPTION OF THE PREFERRED EMBODIMENTS

Figure 1:
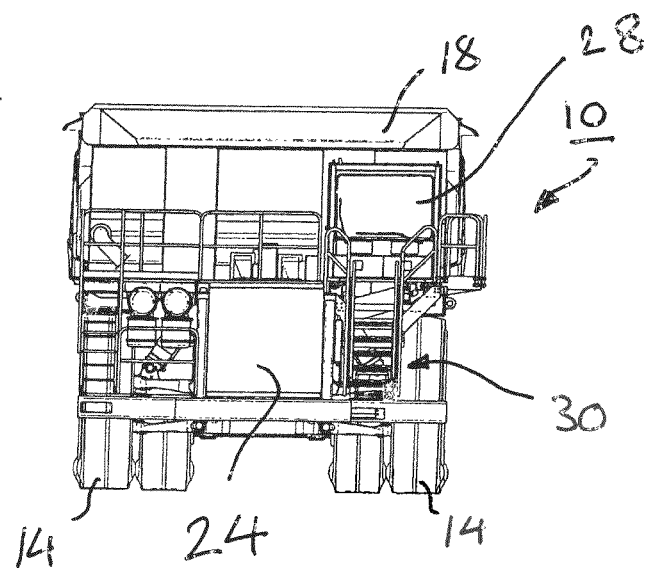
FIGS. 1 to 4: a representation of a dump truck in accordance with the invention in different views.
Figure 2:
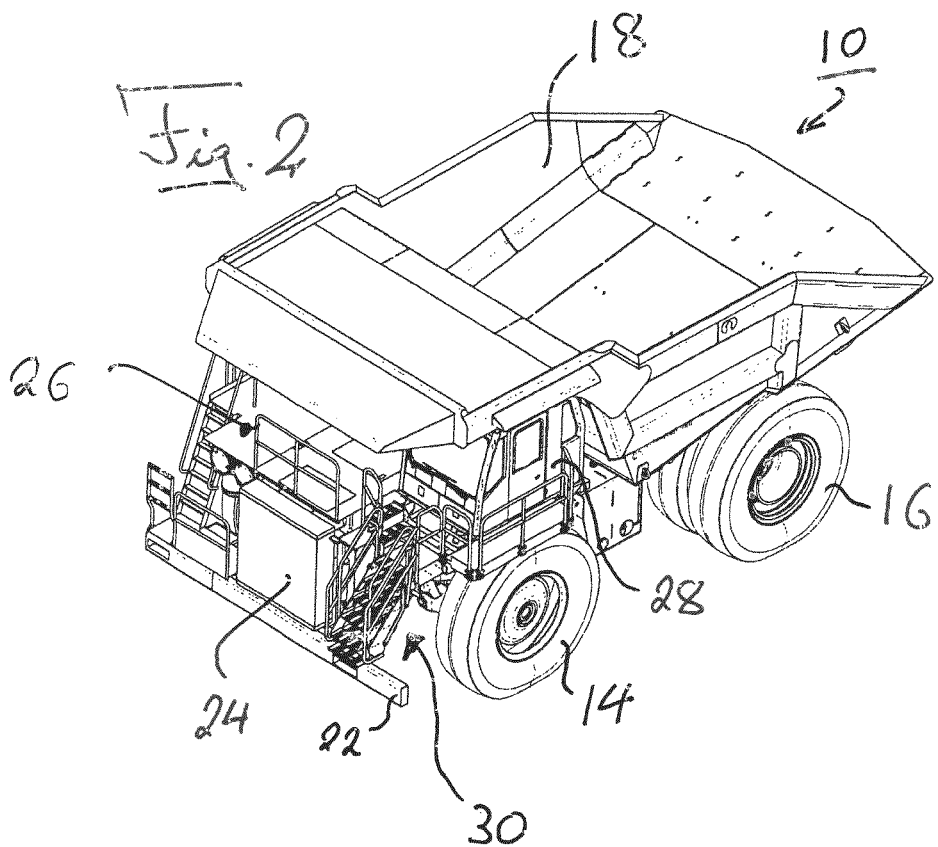
Figure 3:
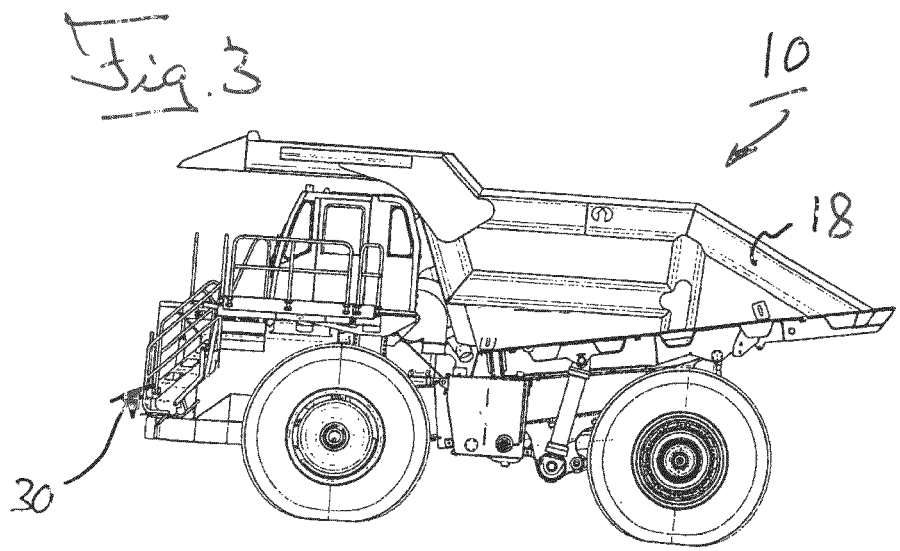
Figure 4:
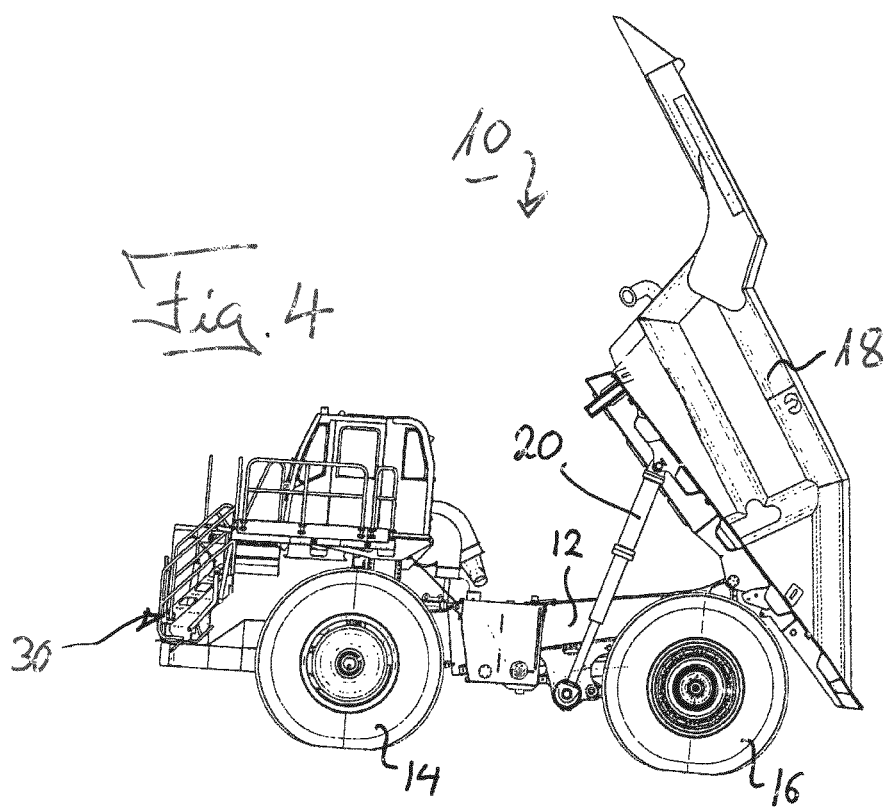

A dump truck 10 is shown in FIGS. 1 to 4. It is here a so-called large dump truck such as is used in ore mines.

Front wheels 14 and rear wheels 16, driven via electric motors not shown in more detail, are supported at a rigid frame 12. A skip 18 is pivotably connected to the frame and is pivotable via corresponding lifting cylinders 20. The vehicle is bounded by the bumper 22 in the region of the vehicle at the front in the direction of travel. A radiator module 24 is arranged above the bumper 22. An upper deck 26 in turn extends over the width of the dump truck 10 above the radiator module 24. An operator's cabin 28 is arranged at a side of the upper deck 26. In the embodiment shown here, the operators cabin is positioned at the side of the upper deck at the left in the direction of travel. The operator's cabin 28 thus lies above the front left wheel 14.

The dump truck 10 has an access system 30 via which the personnel can climb from the ground up to the upper deck 26 from the front.

The access system 30 is shown in a first embodiment variant in FIGS. 5a, 5b and 6a and 6b. Only the front regions of the dump truck, not otherwise shown, are shown in respective perspective views in these Figures. As can first be seen from FIGS. 5a and 5b, the operators cabin 28 is arranged laterally on the upper deck 26 to the left in the direction of travel such that the operator's cabin 28 is accessible from both sides. Both a door 32 is therefore provided as an operator's door at the side of the operator's cabin 28 at the left in the direction of travel and a further door 34 is provided as a passenger door at the side of the operators cabin 28 at the right in the direction of travel. Access flaps 36 and 38 are arranged at the upper deck 26 and allow access to the engine after a corresponding opening. Service work can hereby be carried out from the upper deck.

The upper deck is in each case laterally surrounded by corresponding safety fences 40. Both the operator and the passenger can climb comfortably into the operator's cabin 28 via the corresponding doors 32 and 34 respectively.

An intermediate stand 42 lowered with respect to the upper deck 26 is arranged in front of the operator's cabin 28. Steps 44 and 46 respectively extend laterally up to the upper deck 26 from the intermediate stand 42, as can be seen from FIGS. 5a, 5b. The personnel can thus arrive at the upper deck 26 and thus at the door 36 of the operators cabin 28 from the intermediate stand 42 via the steps 44, on the one hand. On the other hand, the personnel can arrive at the upper deck 26 and at the door 34 of the operator's cabin 28 via the steps 46. Access to both sides of the operator's cabin or to the other regions of the upper deck is equally easy due to the symmetrical step arrangement in each direction.

Steps 48 extend up to the bumper 22 directed to the front in the direction of travel from the intermediate stand 42. The shape of a Y results in a frontal view due to the arrangement of the steps 48, 44 and 46 with respect to one another. In the embodiment in accordance with FIGS. 5a and 5b and 6a and 6b, a lowerable step part 50 is set at the step 48 in the region of the bumper 22. This step part 50 bridges the intermediate space from the upper edge of the bumper 22 to the ground. In the embodiment shown here, the steps 50 are pivotable about a pivot bearing (not shown in any more detail here) from the lowered position in accordance with FIGS. 5a and 5b into an upwardly pivoted position in accordance with FIGS. 6a and 6b. The pivot mechanism can be actuable via a hydraulic pivot apparatus in a manner not shown in any more detail.

Figure 6B:
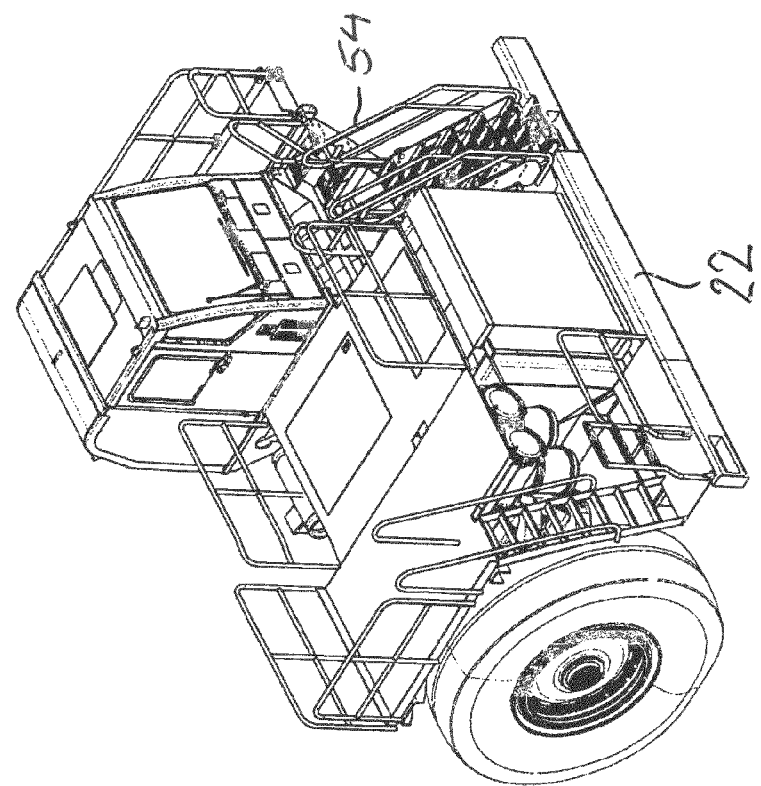
Figure 6A:
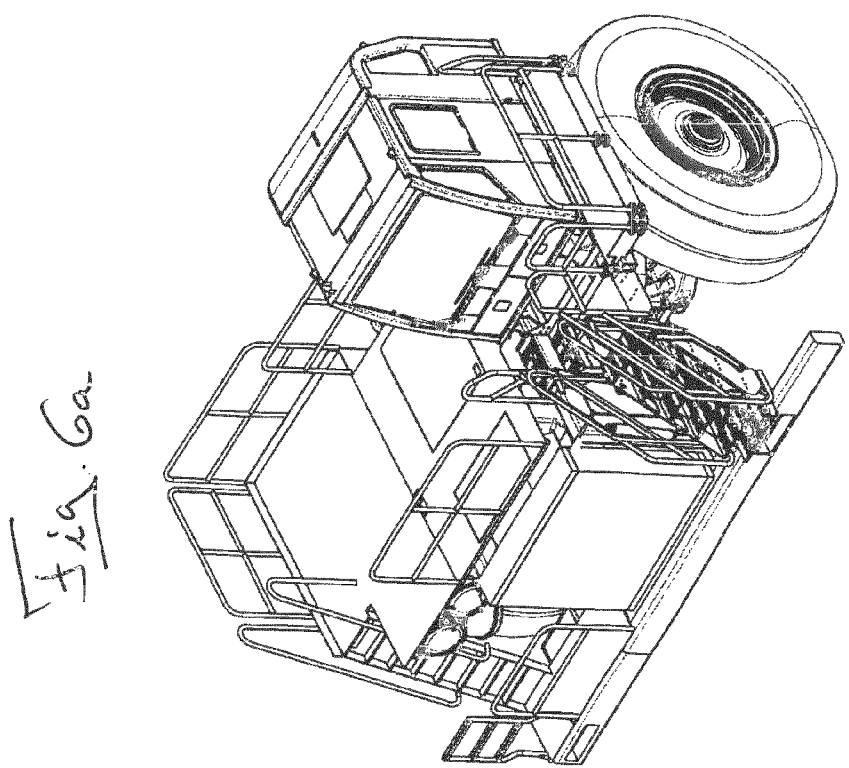
Figure 7B:
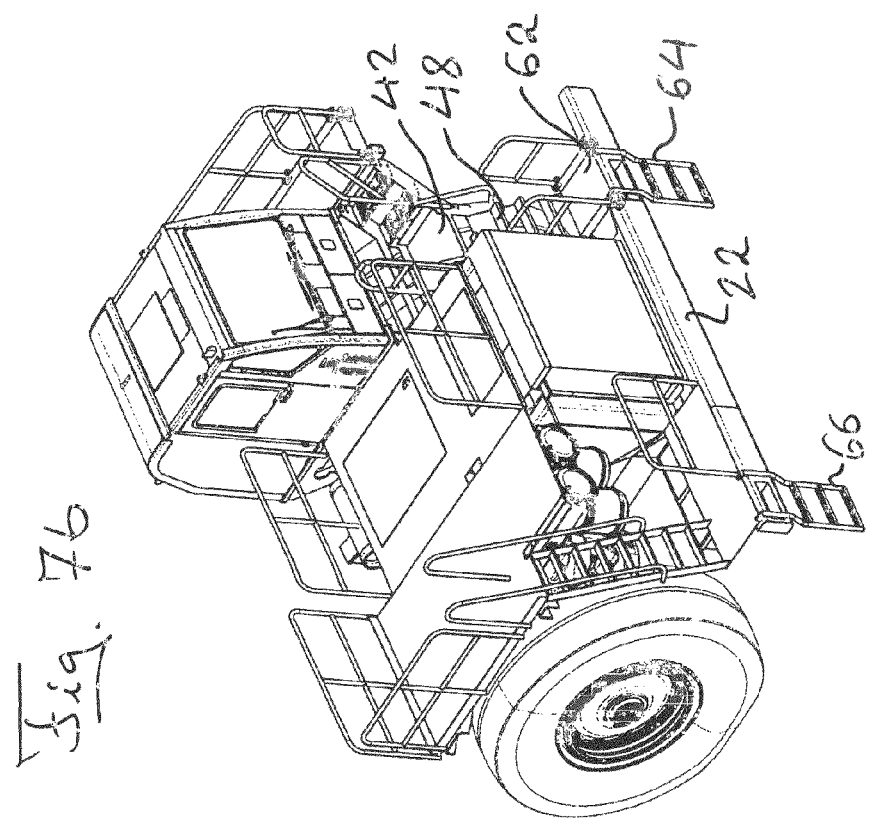
Figure 7A:
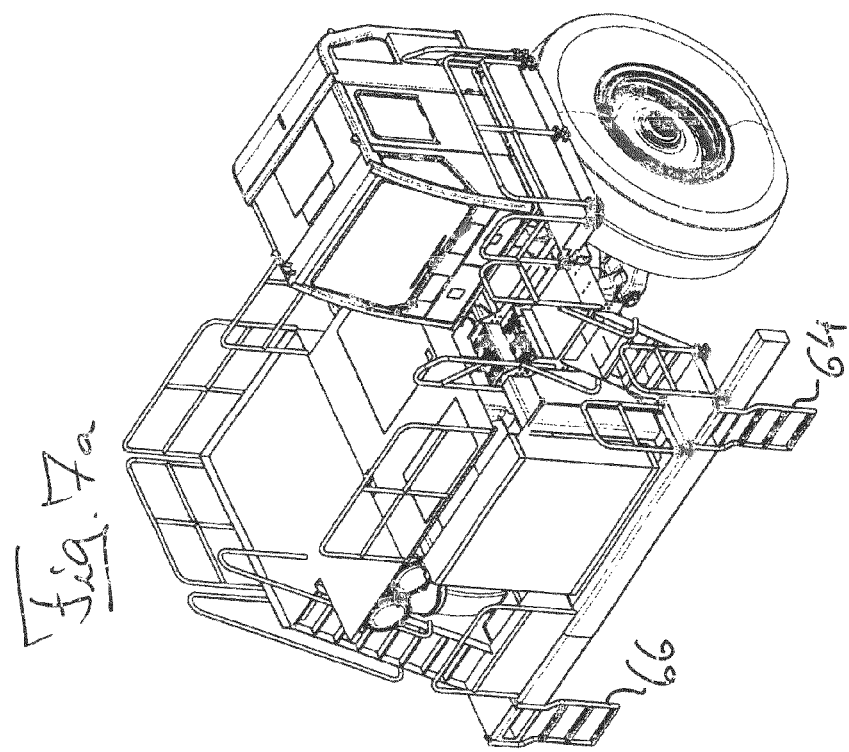

In the upwardly pivoted position shown in accordance with FIGS. 6a and 6b, the treads of the steps 50 are disposed above the treads of the steps 48 since the personnel can now walk on the rear side of the treads of the steps 50 up to the top to the end of the bumper 22. This means that the total steps 48, 50 can also be walked on, at least up to the bumper 22, in the upwardly pivoted state of the steps 50.

Figure 9B:
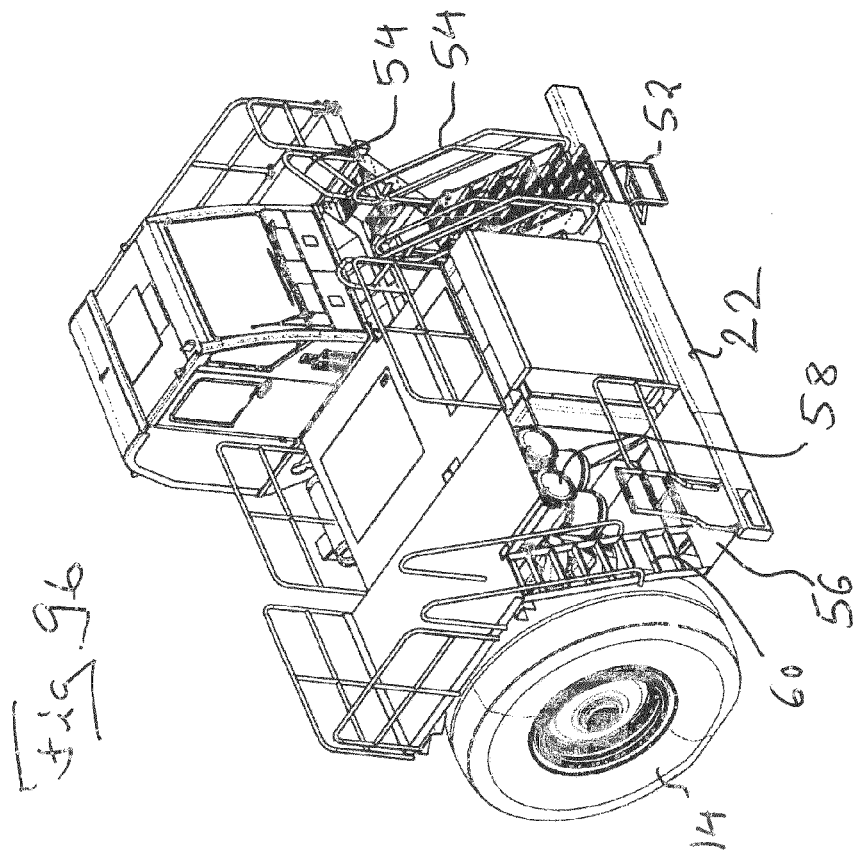
Figure 9A:
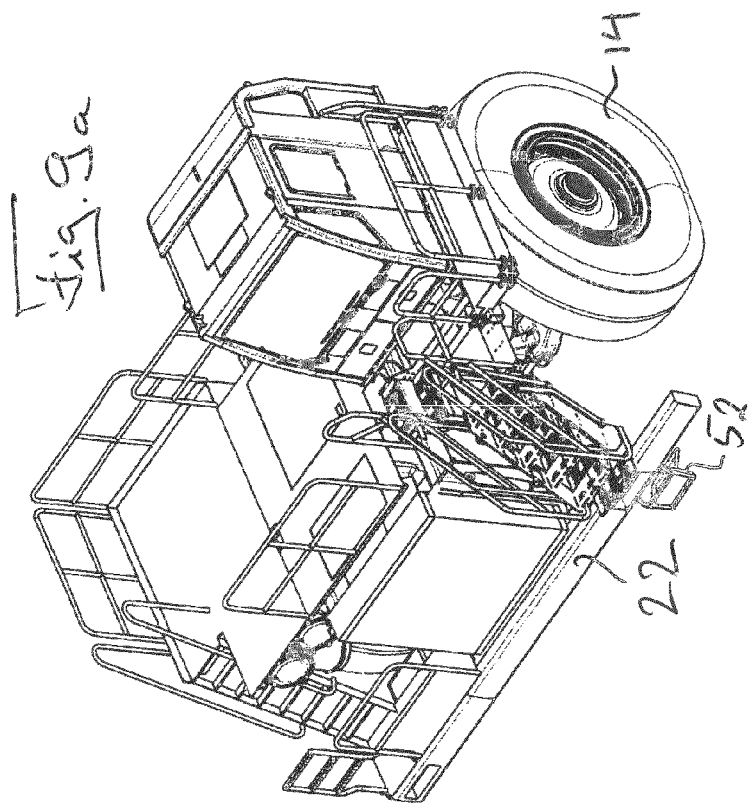

In order also to be able to bridge the intermediate space between the bumper 22 and the ground even when the pivot mechanism of the steps 50 no longer works, an emergency ladder 52 can be provided in accordance with the embodiment variant of FIGS. 9a and 9b, the emergency ladder being able to be set at the bumper or being able to be folded down from it.

Instead of the pivot mechanism of the steps 50 shown in FIGS. 5a, 5b, 6a and 6c, a slide mechanism can also be provided which allows a sliding upward of the steps 50 above the steps 48.

Handrails 54 are provided at all steps 44, 46, 48 and 50. The handrails 54 of the steps 48 and 50 are arranged in this respect such that they cannot impede one another on an upward pivoting of the steps 50.

The steps 44, 46, 48 and 50 of the access system 30 are each inclined by 45 degrees. The spacings of the step treads are equidistant so that the steps can also be walked on comfortably by the personnel.

In addition to the access system 30, the dump truck 10 also has emergency steps 60 which lead from the upper deck 26 up to a second intermediate stand 56 arranged at the level of the bumper 22. The emergency steps 60 in this respect has a substantially steeper inclination than the steps 44, 46, 48 and 50. They are arranged on the side disposed opposite the climb-up system 30, i.e. above the front right wheel 14 in the direction of travel. In the event of a wheel fire on the left side, the personnel can therefore safely leave the dump truck 10 via these emergency steps 60.

The second intermediate stand 56 extends in the embodiment shown here up to the radiator module 24 and allows service work in the region of the air filters 58 arranged beneath the upper deck 26.

Figure 8B:
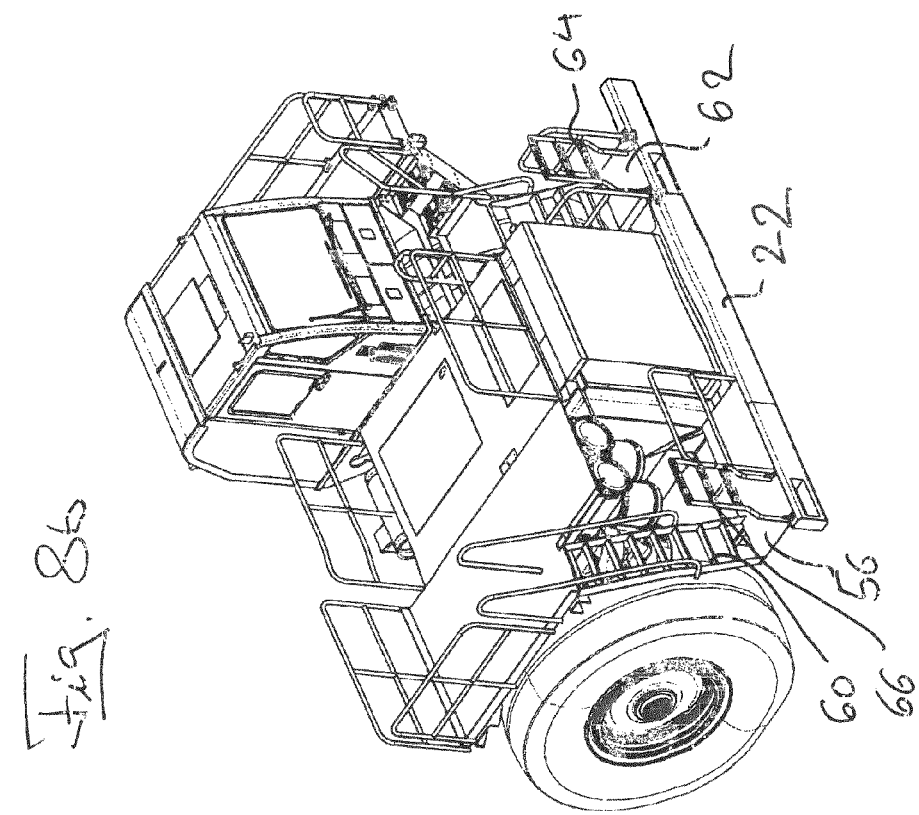
Figure 8A:
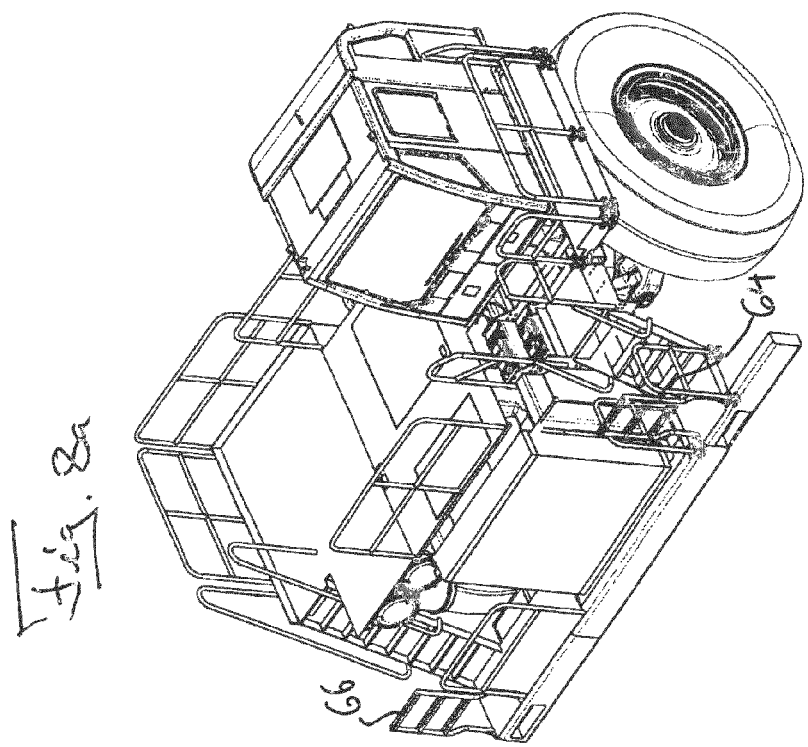

A further embodiment in accordance with the invention is shown in FIGS. 7a, 7b, 8a and 8b. This embodiment variant substantially corresponds to that in accordance with FIGS. 5a, 5b, 6a and 6b so that reference can be made to the description there. There is a difference here only in that the steps 48 lead from the intermediate stand 42 to a third intermediate stand 62 which is arranged at the level of the bumper 22. Only a pivotably arranged ladder 64 leads from the bumper 22 to the ground from the intermediate stand 62 in the embodiment shown here. In the representation in accordance with FIGS. 7a and 7b, this additional ladder 64 is shown in the downwardly pivoted position. In FIGS. 8a and 8b, in contrast, the ladder 64 is pivoted up and is secured in this position such that it simultaneously forms a protective guide rail for the front side of the intermediate stand 62.

A correspondingly flippable ladder 66 likewise leads to the ground from the second intermediate stand 56 which is arranged beneath the emergency steps 60. This ladder 68 can be secured in the upwardly pivoted position (cf. FIG. 8b) in the same way as the ladder 64.

In the access system in accordance with the invention, the lower level of the intermediate stand 42, which is arranged several steps below the cabin floor of the operators cabin 28, ensures an improved view of the operator to the front since the guard rails 40 and 54 respectively do not lie in the direct field of view of the operator in front of the cabin, but are rather lowered further downwardly or are to the side of the cabin.

The invention claimed is:

1. A work machine having an upper deck which can be walked on arranged at a front thereof in a direction of travel above a bumper and having an operators cabin arranged laterally on the upper deck with at least one step-like access system arranged in front of the operator's cabin, wherein an intermediate stand lowered with respect to the upper deck is arranged in front of the operator's cabin and a first set of steps leads laterally to the upper deck from the intermediate stand while a second set of steps leads at least to the bumper from the intermediate stand to the front in the direction of travel.

2. A work machine in accordance with claim 1, wherein inclination of the first and second sets of steps is between 40° and 50°.

3. A work machine in accordance with claim 2, wherein the inclination of the first and second sets of steps is 45°.

4. A work machine in accordance with claim 1, wherein the second set of steps comprises a step part arranged to be extendable from the bumper to the ground.

5. A work machine in accordance with claim 4, wherein the step part is hydraulically actuatable.

6. A work machine in accordance with claim 4, wherein the step part is pivotal around a pivot bearing.

7. A work machine in accordance with claim 1, wherein an emergency ladder unfoldable toward the ground is arranged in the region of the bumper.

8. A work machine in accordance with claim 7, wherein a further intermediate stand is arranged at the level of the bumper.

9. A work machine in accordance with claim 8, wherein the ladder is pivotably connected to the further intermediate stand to be pivotal upwardly or downwardly from the further intermediate stand.

10. A work machine in accordance with claim 1, wherein handrails are arranged laterally at the first and second sets of steps.

11. A work machine in accordance with claim 1, wherein emergency steps directed to the front in the direction of travel extend from the upper deck at a side disposed opposite the operator's cabin down to a second intermediate stand arranged at the level of the bumper.

12. A work machine in accordance with claim 11, wherein a ladder is pivotably connected to the second intermediate stand to be pivotal upwardly or downwardly from the second intermediate stand.

13. A work machine in accordance with claim 11, wherein inclination of the emergency steps is steeper than inclination of the first and second set of steps arranged in front of the operator's cabin.

14. A work machine in accordance with claim 1 which is a truck.

15. A work machine in accordance with claim 14, wherein the truck is a dump truck.

* * * * *